United States Patent [19]

Karr

[11] Patent Number: 5,165,313
[45] Date of Patent: Nov. 24, 1992

[54] BAR PULLER FOR AUTOMATIC LATHE

[76] Inventor: Robert Karr, 747 Kirkwall Pl., Milpitas, Calif. 95035

[21] Appl. No.: 735,872

[22] Filed: Jul. 25, 1991

[51] Int. Cl.⁵ .................. B23B 13/12; B23B 15/00
[52] U.S. Cl. ................... 82/127; 279/106; 414/14
[58] Field of Search ............ 82/127, 126; 279/35, 279/106; 414/14, 736

[56] References Cited

U.S. PATENT DOCUMENTS

| | | | |
|---|---|---|---|
| 4,321,845 | 3/1982 | Szabo et al. | 82/127 |
| 4,464,958 | 8/1984 | Luks | 82/127 |
| 4,522,091 | 6/1985 | Tottolon | 82/127 X |
| 4,580,470 | 4/1986 | Buck | 82/127 |
| 4,617,847 | 10/1986 | Schaldach | 82/127 |
| 4,924,738 | 5/1990 | Che | 82/127 |
| 5,046,226 | 9/1991 | Che | 414/14 X |

FOREIGN PATENT DOCUMENTS 47-43274  2/1972  Japan ..................... 279/35

OTHER PUBLICATIONS

Progressive Machinery Sales, Inc., "CNC Bar Pullers", Apr. 1989, brochure.

Primary Examiner—Z. R. Bilinsky
Attorney, Agent, or Firm—Bielen, Peterson & Lampe

[57] ABSTRACT

A bar puller for a numerically controlled turret lathe having a mounting member for mounting the bar puller to one of the stations of a rotary turret on the lathe, the bar puller having a pair of gripping jaws that are pivotally mounted between clevis plates on pivot pins and biased by a plurality of compression springs, the jaw blocks carrying adjustable gripping members that engage the end of a bar stock and draw the bar stock in the chuck on displacement of the turret carriage with the gripping jaws being released by further displacement of the turret carriage after a chuck has been secured on the stock.

8 Claims, 2 Drawing Sheets

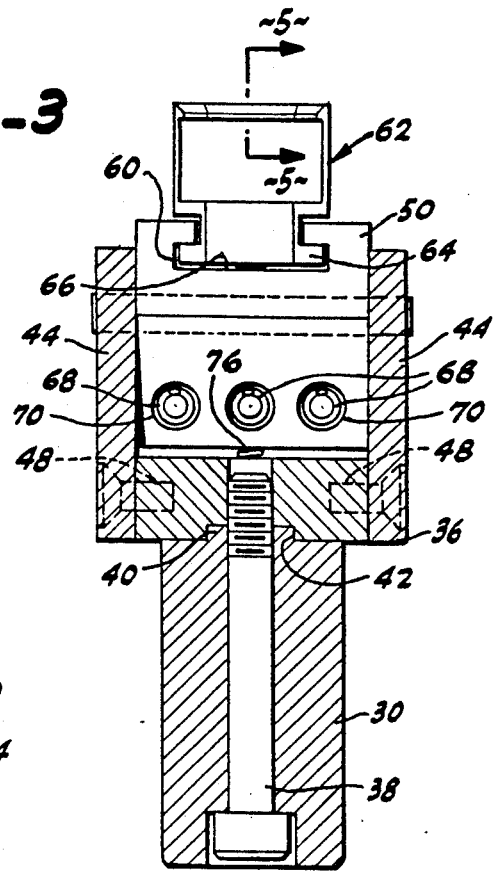
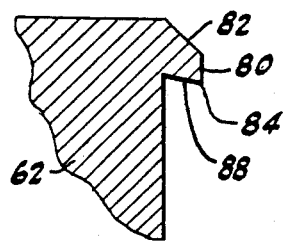
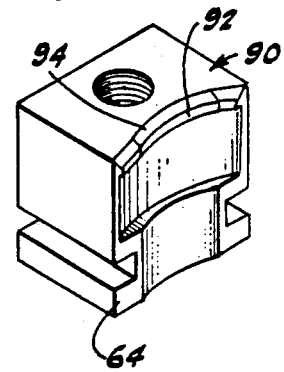
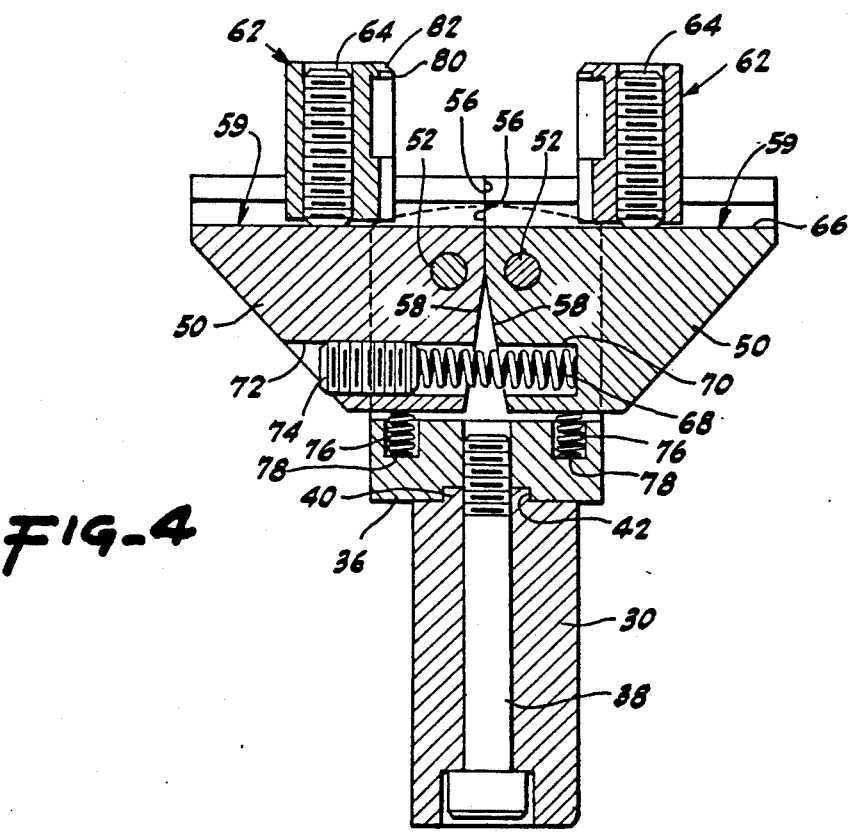

BAR PULLER FOR AUTOMATIC LATHE

BACKGROUND OF THE INVENTION

This invention relates to a bar stock feed mechanism for machine tools to advance working bar stock and in particular the invention relates to an attachment for a numerically controlled turret lathe to enable the bar stock to be automatically advanced. The feed mechanism attachment or bar puller is preferably designed and constructed for mounting at one station of a rotary turret of an automatically controlled turret lathe that has multiple stations for mounting machining tools that selectively rotate into operating position for machining a workpiece held in the rotating spindle chuck or collet of the lathe.

One such bar puller was described in U.S. Pat. No. 4,321,845, entitled "Bar Puller for Numerically Controlled Lathe" of which this inventor was one of the joint inventors therein. In that patent a front mounted bar puller is described that mounts to one station of the rotary turret of a numerically controlled lathe. When a work piece is severed from the bar stock held in the chuck of the lathe, the bar puller is rotated into an axially aligned position with the remaining stock and the turret, mounted on a carriage, is moved to contact the face of the puller with the end of the remaining stock. A controlled displacement contact displaces a spring loaded face of the puller and disengages a set of retracted gripping jaws which engage the periphery of the end of the bar stock. The lathe chuck is automatically relaxed and the turret and gripped bar retracted a predefined displacement pulling the stock. The lathe is then engaged on the stock and the turret further displaced causing the gripping jaws to be retracted by cam action to release the working stock, resetting the puller for the next cycle.

The bar puller of that invention is superior for pulling working stock or product pieces with minimal damage to the stock or piece engaged. However, the actuating mechanism is complex and the resulting product expensive, particularly where machining operations do not require such special handling.

Since the invention above described, there have been other bar pullers having less complicated actuating mechanisms that have been proposed. One such puller has spring loaded jaws aligned in opposed linear tracks with a central alignment stop, wherein the jaws are designed to spread apart when contacted by the end of the working stock on displacement of the mounting turret toward the stock end.

Other bar pullers using spring biased gripping mechanisms engage the side of the working stock adjacent the stock end.

It is a primary object of this invention to provide an inexpensively manufactured bar puller that grips a working stock from the end of the stock with minimal damage to the stock and with a mechanism that minimizes the bite necessary to successfully engage the stock with sufficient grip to accurately pull the stock the distance required. In this manner the gripping jaws and actuating mechanism must be designed to minimize slippage without excess scoring of the working stock or work piece.

SUMMARY OF THE INVENTION

The bar stock feed mechanism of this invention is a bar puller that is designed to be used in a rotary turret of a numerically controlled lathe. The bar puller can be adapted for other machine tools where the end of the working stock is to be engaged for advancing the stock, and may be utilized for other tasks where the end of items similar in configuration to bar stock, particularly where cylindrical members hexagonal members or other members with similar end shapes are to be gripped for removal or displacement.

The bar puller of this invention includes a mounting shank for mounting the puller to a machine tool, preferably a numerically controlled lathe. The mounting shank may be of different design to accommodate the puller to different machines or a particular tool mount, and may be end mounted or side mounted with round or square shanks.

Preferably, the bar puller is designed for installation on one of the tool stations of the rotary turret of a numerically controlled lathe for the purpose of automatically displacing the bar stock in a spindle chuck or similar releasable holding device. The bar puller is mechanical in operation and relies upon the programmed sequence control system of the lathe to initiate actions involving the puller. The puller is a detachable auxiliary component that occupies a turret station only when advantageous to utilize the bar puller in a machining operation generally, of a repetitive piece-work type nature.

The mounting shank is fixed to a base block that has two opposed clevis plates having a pair of parallel cross pins, each pin pivotally supporting a jaw block on which are mounted adjustably positioned gripping jaw members. The jaw members are slidably mounted in channel tracks with set screws to fix their position in accordance with the diameter or width of the bar stock to be displaced. This positioning feature allows infinitely variable positioning of the jaw members within the limits of the channel tracks to allow precision in the diametrical adjustments.

The jaw members are configured with a chamfered leading edge that acts in the manner of a cam surface to part the pivotally mounted jaw blocks when the beveled edge of the jaw contacts the perimeter of the end of the stock. The jaw blocks resist parting by the force of compression springs seated between the jaw blocks. The gripping faces of the jaw members are preferably curved in configuration to generally conform to a range of sizes of round stock. To accommodate a different range of stock sizes and cross section configurations, the jaw members are easily replaceable with members having a different curvature. The curvature of the face of the jaw members approximate the diameter of the stock to provide greater distribution of the gripping force to minimize marking of the stock. The precision setting of jaw members minimizes the displacement of the jaws required to effectively engage and grip the stock.

The bar puller is easily disassembled allowing replacement of the compression springs where variation in the force of the grip is desired. The bar puller is easily mounted to a tool station using the standard shank disclosed or other conventional mounting shanks as is well known in the industry.

BRIEF DESCRIPTION OF THE DRAWINGS

FIG. 3 is a cross-sectional view taken on the lines 3—3 in FIG. 2.

FIG. 4 is a cross-sectional view taken on the lines 4—4 in FIG. 2.

FIG. 5 is an enlarged cross-sectional view of the jaw member taken on the lines 5—5 in FIG. 3.

FIG. 6 is a perspective view of an alternate embodiment of a jaw member.

DETAILED DESCRIPTION OF THE PREFERRED EMBODIMENTS

Figure 1:
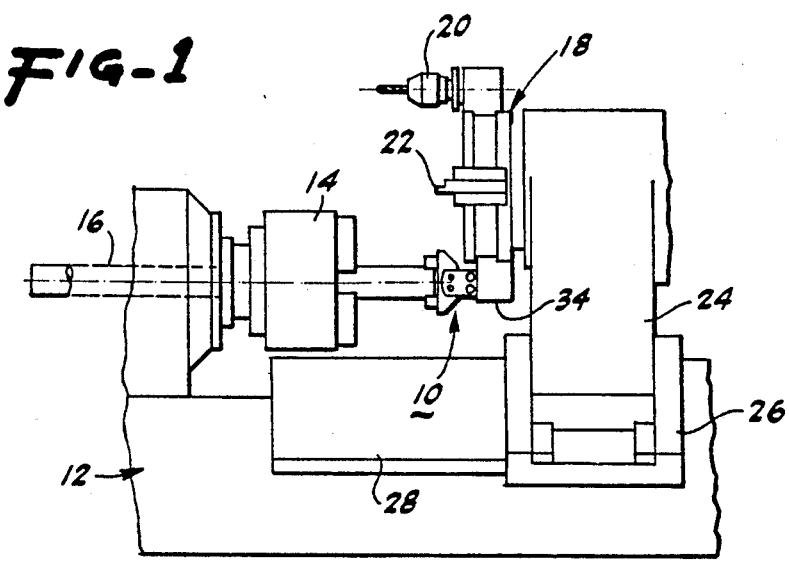
FIG. 1 is a schematic illustration of the bar puller mounted on a turret lathe.

Referring to FIG. 1, the bar puller of this invention, designated generally by the reference numeral 10, is preferably utilized on a numerically controlled turret lathe 12. The turret lathe 12 has a hollow chuck 14 through which an elongated working stock 16 is mountable. Facing the chuck 14 is a rotatable turret 18 for mounting one or more tools such as a drill 20 and cutting tool 22. The turret shown is octagonal in configuration with eight tool stations which on controlled pivot of the turret can be selectively rotated to the working station, here the lower most position, where the bar puller is shown mounted and positioned.

The turret is in turn mounted to a carriage 24 that is mounted for displacement on a first axis on a moveable bed 26 which in turn is mounted for displacement on a second axis perpendicular to the first axis on a stationary bed 28.

Turret station selection and the movement of the carriage 24 are automatically controlled by an internal programmable controller in the lathe 12. In FIG. 1 the turret has been positioned to align the bar puller 10 along the axis of rotation of the chuck and bar stock. The bar puller 10 is shown with its jaws gripping the peripheral outer edge of the end of the stock 16 just prior to initiating the pull operation which is accomplished by automatic displacement of the turret upon command release of the stock in the lathe chuck. This operation is identical to that described for the bar puller of U.S. Pat. No. 4,321,845.

Figure 2:
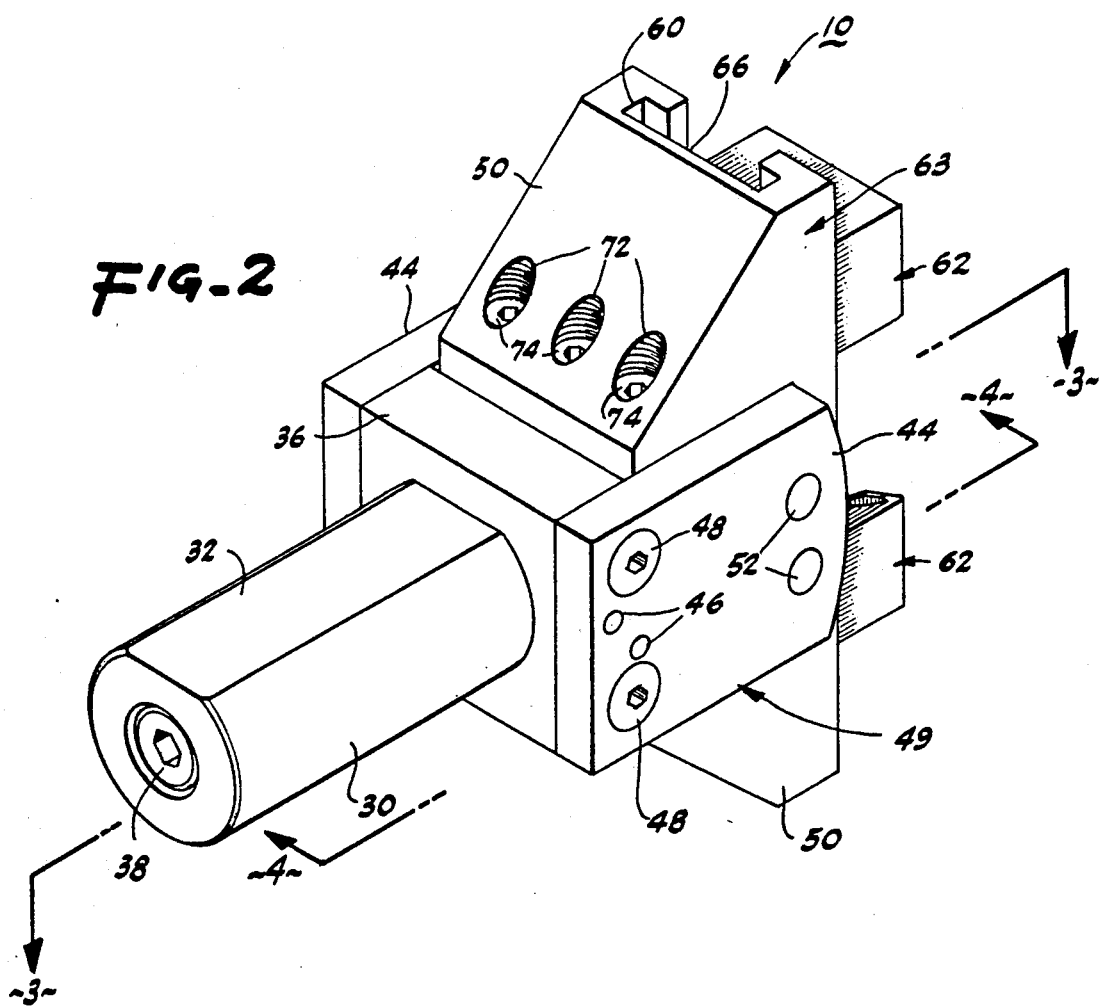
FIG. 2 is a perspective view of the bar puller.

The bar puller 10 of this invention, however, utilizes a somewhat simpler mechanism for engagement and release of the bar puller on the working stock 16. As shown in the perspective view of FIG. 2, the preferred construction of the bar puller 10 includes a standardized mounting shank 30 having a key flat 32 for mounting in a station block 34, as shown in FIG. 1, on the rotary turret 18 of the turret lathe 12. The shank 30 of the bar puller 10 is mounted to a base block 36 by an end located machine screw 38. A shank neck 40 is positioned in a socket 42 on the back of the base block, as shown in the cross sectional view of FIGS. 3 and 4 and the shank is secured by the machine screw 38. Other mounting means can be devised to attach to the socket of the base block.

Attached to the base block 36 are two opposed clevis plates 44 which are positioned by a pair of locating pins 46 and secured by counter-sunk, machine screws 48. The assembly of the shank 30 base block 36 and clevis plates 44 form an actuator support structure 49. The clevis plates 44 bracket a pair of jaw blocks 50 which are pivotally mounted between the plates 44 on pivot pins 52. The pivot pins 52 are press fit through holes in the clevis plates and pass through each of the jaw blocks 50 allowing the jaw blocks to pivot on the pins 52.

As shown in FIG. 4, the jaw blocks 50 have a contact face 56 where the blocks abut and an adjacent tapered-back, fulcrum face 58 below the pivot pins 46 to permit the jaw blocks a limited degree of pivot. The jaw blocks 50 each have a jaw mounting face 59 which faces the end of the bar stock during pulling operations. The two jaw mounting faces are aligned when the jaw blocks 50 are in contact with one another.

As shown in FIG. 3, each of the jaw block has a slotted slide channel 60 in the jaw mounting face 59 for mounting a slidable jaw member 62 having a complimentary keyed base 64 positioned in the slide channel 60. The jaw member 62 of each jaw block 50 can be selectively positioned in the slide channel 60 by loosening and subsequently tightening a set screw 64 which engages the channel bottom 66. The jaw blocks 50 are biased to a contact position as shown in FIG. 4 with the contact faces 56 in mutual contact by three compression springs 68 which are located in blind holes 70 in the fulcrum face 58 one of the blocks and a threaded hole 72 in the fulcrum of the other block. The threaded hole is capped by a set screw 74 such that the compression springs seat in recesses. The fulcrum faces are contiguous with the contact faces but are situated relative to the pivot such that pivot pin functions as a fulcrum for forces applied to the fulcrum face, wherein forces directed to part the fulcrum faces force together the contact faces. The combined spring force of the three compression springs 68 determines the gripping force of the jaw members 62. By tightening the set screws the spring force can be increased.

To maintain the position of the jaw members substantially perpendicular to the axis of the shank 30 a pair of smaller compression springs 76 are set into recesses 78 in the base block 36 as shown in FIG. 4. The compression springs 76 contact the bottom of the blocks 50 for maintaining alignment. The springs have weaker spring constants than the main gripping springs and permit the jaw members to seek alignment on contact with the working stock before separation. The jaw blocks 50 and their complementary components comprise an actuator mechanism 63 that is supported by the actuator support structure 49.

The jaw members 62 each have a gripping face 80 and a cam action face 82 as shown in FIG. 4 and in the enlarged partial view of the a jaw member 62 in FIG. 5. The cam face 82 and grip face 80 have a curvature that approximates the curvature of the bar stock that is being worked in the turret lathe 12. The jaws of the bar puller are selectively positioned in the slide channels 60 such that the end of the bar stock first contacts the cam face 82 as the turret carriage moves toward the bar stock. As the bar stock is locked in the chuck 14, the end of the stock slides down the cam face 82 forcing the jaw members apart. As the jaw members are locked into the slide channels 60, the jaw members 62 are separated by pivoting of the jaw blocks 50 on the pivot pins 52 against the force of the compression spring members 68.

After the bar puller advances on the end of the working stock a preset distance, the turret carriage 24 is stopped and the chuck is partially opened to release its grip on the bar stock 16. The turret carriage 24 is then retracted causing the lip 84 of the cam face 82 to bite into the periphery of the bar stock 16 under force of the three compression spring members 68 causing the bar stock to follow the displacement of the turret carriage. The pivot of the two jaw blocks aids in directing the angle of attack of the lip 84. Once the desired positioning of the bar stock is achieved, the carriage is halted, the chuck 14 is tightened and the turret carriage 24 is then further retracted forcibly pulling the jaw members 62 off from the end of the stock 16. To minimize damage to the end of the bar stock it is therefore desired to match the spring constant of the three spring members 68 to produce the desired gripping force that will be sufficient to engage the bar stock when withdrawing the stock in the chuck and yet not be so forceful that the jaw members cannot slip off from the end of the stock when the stock is locked into the lathe chuck. Where an adequate bite is not achieved by having the lip 84 on the cam face 82 formed by an orthogonal cut, the cut 88 can be slightly acute as shown in the enlarged view of FIG. 5.

To accurately set the jaw members to achieve the desired grip on a consistent basis, a representative piece of the working stock is set in the lathe chuck and an end segment is turned 0.002–0.005 inch under nominal size. The slidable jaw members are then set to this sized-down section and the set screws tightened.

The jaw members are thus set for appropriate displacement for nominal size. For most applications, adjustment of the force of grip of the jaw members is easily performed by tightening or loosening the set screws 74 capping the bias springs 68. In general, the springs are selected such that one turn of the set screws after the initial contact is made is sufficient. Further tightening or loosening for heavier or lighter working stock, respectively, may be in order.

These features make the bar puller of this invention an effective and inexpensive device for pulling and setting a variety of different size stock and work pieces. The curvature of the grip face 80 is designed to approximate the curvature of the bar stock in order to expand the contact area of the grip face. The curvature need not match precisely the curvature of the bar stock and a jaw member having a specified radius of curvature can be utilized on a range of sizes of bar stock. For example, the single curvature shown having a 1¼ inch radius can effectively operate on bar stock having a diameter from ⅜ inch to 2½ inches. The jaw members 62 can be easily replaced with other members having a different curvature to provide the best results for the range of stock sizes.

As shown in FIG. 6, an alternately configured jaw member 90 is shown. In the jaw member 90 of FIG. 6 the grip face 92 has two different curvatures on both the grip face and the cam face 94 to maximize the effective contact within a range of sizes of stock.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A bar puller mountable on a machine tool having a working stock with a perimeter end that is gripped by the puller and the stock advanced during operation of the machine tool, the puller comprising:
   a support structure having means for mounting the support structure on the machine tool;
   opposed jaw blocks, each block having a contact face and a jaw mounting face substantially orthogonal to the contact face;
   means for pivotally mounting the maw blocks on the support structure on displaced axes;
   means for biasing the jaw blocks in an angular direction wherein the contact faces are in mutual forced contact;
   opposed jaw members, each jaw member being constructed with a beveled cam face and a grip face;
   means for mounting each jaw member on a jaw block with the beveled cam faces and grip faces being displaced in substantial opposition; and
   means for adjusting the separation of the jaw members such that the beveled cam faces contact the perimeter end of the working stock on alignment and advance of the bar puller toward the end of the working stock, whereon on contact the jaw blocks are pivotally separated and the grip face of the jaw members grips the perimeter end of the working stock; and
   wherein the means for biasing the jaw blocks comprise spring means wherein the jaw blocks each include an opposed fulcrum face contiguous with the contact face and the spring means intersects the opposed fulcrum faces for forcing the fulcrum faces apart and the contact faces together, the spring means comprising ak plurality of compression springs having ends set in recesses in the fulcrum faces.

2. The bar puller of claim 1 wherein the support structure includes a mounting shank and a clevis structure having a base and side members, the mounting shank being connected to the base and the side members supporting the pivotal mounting means.

3. The bar puller of claim 2 wherein the pivotal mounting means includes a pivot pin on each jaw block connected to the side members.

4. The bar puller of claim 1 wherein the opposed jaw blocks are first and second jaw blocks, and the pivotal mounting means are first and second pivot pins arranged on displaced axis that are parallel.

5. The bar puller of claim 1 wherein the means for mounting the jaw members on the jaw block comprise slotted channels in the jaw blocks and keyed bases in the jaw members slidably engageable with the slotted channels of the jaw blocks.

6. The bar puller of claim 5 wherein the adjustment means comprises set screws in the jaw members which on tightening engage the slotted channel of the jaw blocks.

7. The bar puller of claim 1 wherein the gripping faces of the jaw members have a curvature operable on a range of sizes of the bar stock.

8. A bar puller mountable on a machine tool having a working stock with a perimeter end that is gripped by the puller and the stock advanced during operation of the machine tool, the puller comprising:
   a support structure having means for mounting the support structure on the machine tool;
   opposed jaw blocks, each block having a contact face and a jaw mounting face substantially orthogonal to the contact face;
   means for pivotally mounting the jaw blocks on the support structure on displaced axes;
   means for biasing the jaw blocks in an angular direction wherein the contact faces are in mutual forced contact;
   opposed jaw members, each jaw member being constructed with a beveled cam face and a grip face;
   means for mounting each jaw member on a jaw block with the beveled cam faces and grip faces being displaced in substantial opposition;

means for adjusting the separation of the jaw members such that the beveled cam faces contact the perimeter end of the working stock on alignment and advance of the bar puller toward the end of the working stock, wherein on contact the jaw blocks are pivotally separated and the grip face of the jaw members grips the perimeter end of the working stock; and springs positioned in recesses in the support structure wherein the springs engage the jaw blocks for aligning the jaw blocks.

* * * * *